July 12, 1932.  J. G. JONES  1,866,711
METHOD AND APPARATUS FOR PERFORATING MOTION PICTURE FILM
Filed Dec. 27, 1929   2 Sheets-Sheet 1
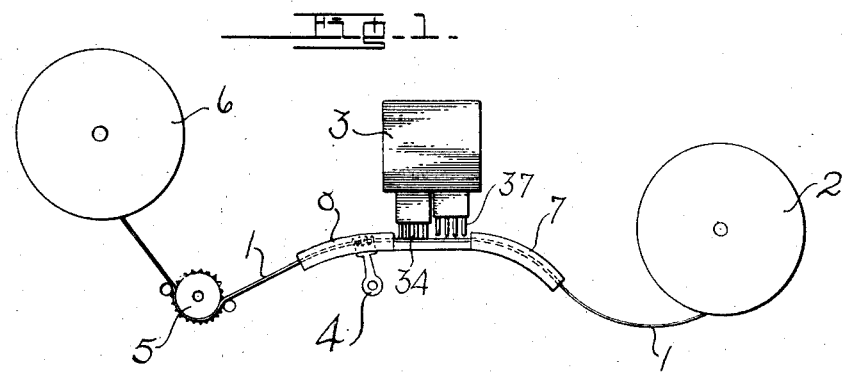
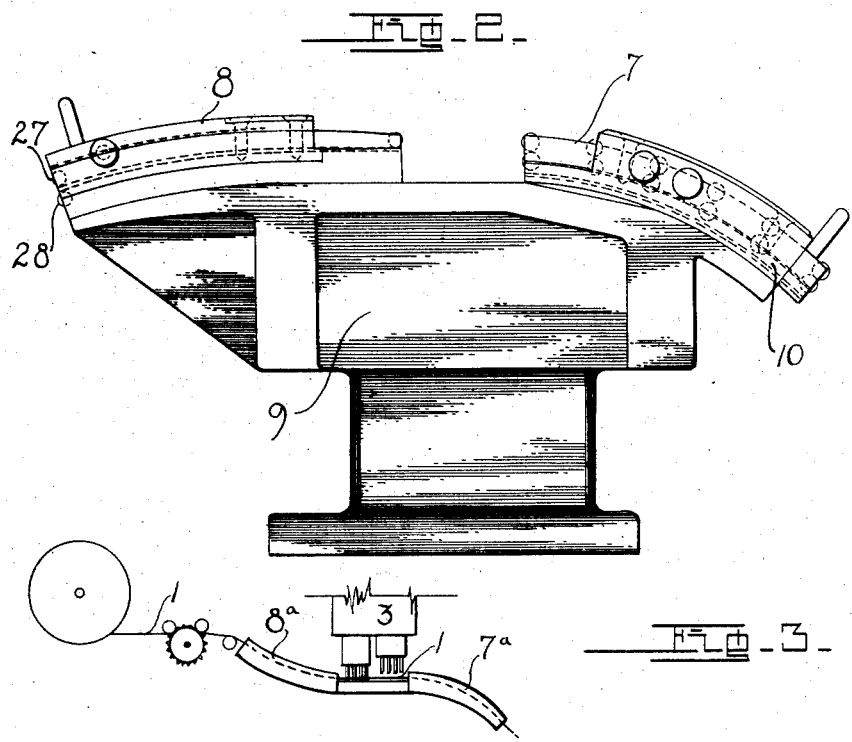
Inventor
John G. Jones
By
Attorneys July 12, 1932. J. G. JONES 1,866,711
METHOD AND APPARATUS FOR PERFORATING MOTION PICTURE FILM
Filed Dec. 27, 1929 2 Sheets-Sheet 2
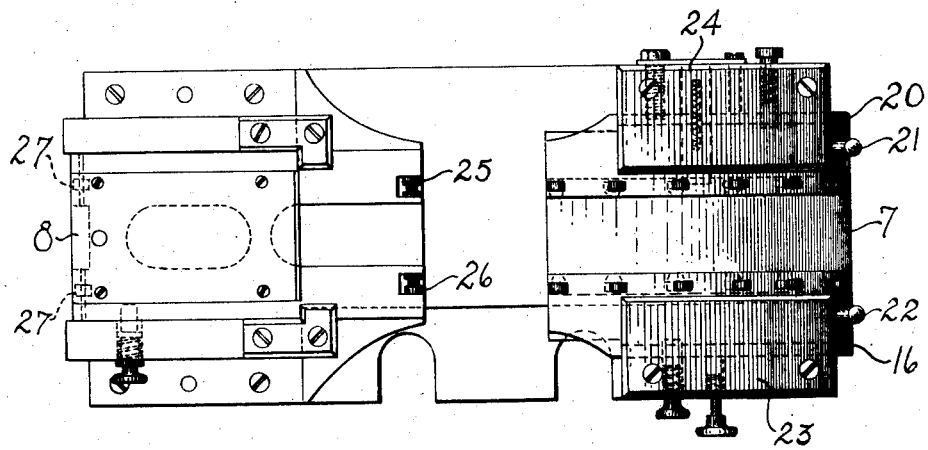
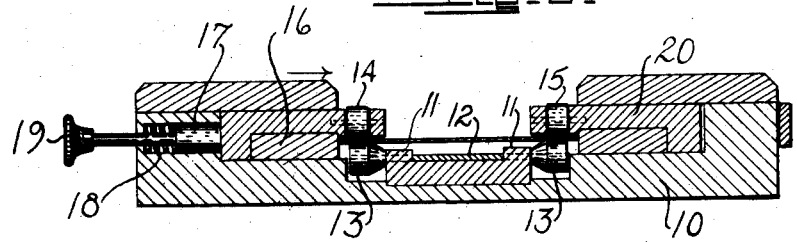
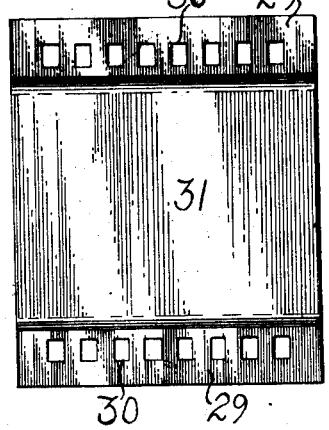
Inventor
John G. Jones Patented July 12, 1932

1,866,711

UNITED STATES PATENT OFFICE

JOHN G. JONES, OF ROCHESTER, NEW YORK, ASSIGNOR TO EASTMAN KODAK COMPANY, OF ROCHESTER, NEW YORK, A CORPORATION OF NEW YORK

METHOD AND APPARATUS FOR PERFORATING MOTION PICTURE FILM

Application filed December 27, 1929. Serial No. 416,874.

This invention relates to perforating machines for motion picture film. One object of my invention is to provide a perforating machine which will not contact with either side of a film during the perforating operation. Another object of my invention is to provide a perforator in which the film guides and the punch and die contact only with the edges of the film. Another object of my invention is to prevent buckling and hold the film rigorously flat beneath the punch and die. Still another object of my invention is to provide a film guideway with as little friction as possible and with a means for holding a short section of the film perfectly flat and other objects will appear from the following specification, the novel features being particularly pointed out in the claims at the end thereof.

As is well known in the motion picture art it is necessary to perforate the film with extreme accuracy since small irregularities between the perforations will produce flicker on the screen and will prevent satisfactory pictures from being made and shown.

This difficulty greatly increases with the width of the film, it being comparatively simple to hold a 16mm. film sufficiently flat for perforating and being very difficult to hold a wide film such as has lately come into use with the "panoram" type of motion pictures and with sound motion pictures and for other purposes, this film often being 75 mm. or more in width.

In addition to the difficulty of holding the film flat it has been found difficult to perforate film without touching either side of the motion picture film surface. In ordinary black and white pictures of the standard 35 mm. width where a sensitive emulsion was coated on one side only, the film could be supported between its edges without seriously damaging the film.

But with the systems of color photography which have come into use film coated on both sides is employed more and more often and any part of a perforating machine which contacts with a part of the sensitive coating on such film is liable to leave scratches, abrasion marks and other markings which may appear in the picture area. In the case of color motion pictures this is particularly disagreeable because such scratches ordinarily would appear through only that surface which is dyed red or green (in a two color system) so that there will result unpleasant red or green flashes on the screen which are far more noticeable than the ordinary scratches.

The desired type of motion picture apparatus, therefore, is one in which the film is supported solely outside of that area which is later used for pictures and one in which the film is held perfectly flat during the perforating operation since, of course, buckling will alter the width between the perforations and thus spoil accurate registration of the film.

Coming now to the drawings wherein like reference characters denote like parts throughout:

Fig. 1 is a side elevation of a schematic showing of a film perforator constructed in accordance with my invention;

Fig. 2 is an enlarged detail in side elevation showing the film guides to and from the punch and die which perforate the film;

Fig. 3 is a diagrammatic showing of another form of my invention;

Fig. 4 is a plan view of the film guides shown in Fig. 2;

Fig. 5 is a section through the film guides; and

Fig. 6 is a plan view of the die plate showing the cutaway or relieved central portion.

In perforating film it is common practice to move film 1 from a supply reel 2 past a punch 3 by means of a suitable intermittently driven film moving mechanism 4 from which the film 1 may be led over a sprocket 5 and finally wound up on a film reel 6. Leading to and from the punch 3 are guideways 7 and 8 and in accordance with my invention I prefer to curve these guideways.

The direction of the curve is not particularly material since the film may be held against buckling by curving it in either direction or in both directions. In Fig. 3 a modified form is shown wherein the curved guide 7A is curved in one direction and the guide 8A leading from the punch 3 is curved in an opposite direction.

In a preferred embodiment of my invention, as shown in Fig. 2, the guide 7 and the guide 8 may be mounted upon a suitable support 9.

Guide 7 consists of a curved plate 10 arcuate in shape, this curve plate, as best shown in Fig. 5, having cutaway portions in the center 11 and 12 and having film supporting rollers 13 adapted to contact with the edges only of a film passing over the plate 10. Above rollers 13 are mounted second sets of rollers 14 and 15, the former set being carried by a removable member 16 which is thrust in the direction shown by the arrow by means of a plunger 17 pressed by spring 18 and having a handle 19 by which the plunger may be moved against spring pressure.

The second set of rollers 15 is carried by a removable plate 20 as shown in Fig. 4, both members 16 and 20 can be removed by handles 21 and 22 when a spring catch 23 or 24 is released by moving the plates through an arcuate path from beneath the holding plates 23 and 24.

The curved guide 8 is quite similar to the curved guide above described except that the rollers 25 and 26 are spaced some distance from the rollers 27 and 28 so that there will be room between these sets of rollers to provide an intermittent film moving mechanism of any desired kind such as that shown diagrammatically in Fig. 4.

From Fig. 6 it will be seen that the die member is provided with raised edges 29 which have two series 30 of perforations therein and between the raised edges 29 is a countersunk central portion 31. By cutting away the central portion of the die in this manner no part is left to contact with that portion of the film which is used for pictures.

Ordinarily a film and particularly a wide film could not lie flat on a die of this kind but by flexing the film almost, if not quite, up to the die the film is held extremely flat across the face of the die and any tendency to buckle is eliminated.

It is common practice in order to register the film properly on the die to press the film in one direction by means of a slide. This is shown in Fig. 5 wherein the plate 16 is spring pressed in the direction shown by the arrow so as to contact with the edge of the film. If, however, the film is allowed to buckle slightly, the edges of the film will be pressed closer together than they should be. By curving the film to or from the die it is practically impossible to buckle the film with any ordinary pressure.

The punch as shown diagrammatically in Fig. 1 may be of any standard or preferred type in which there are a series of guiding fingers 34 and a series of punches 35, the guiding fingers being adapted to position the film by entering the freshly cut perforations in advance of the punches which cut a second set of apertures in the film. This structure may be of any well known or preferred type.

Having thus described my invention, what I claim as new and desire to secure by Letters Patent is:

1. In a motion picture film perforating machine, the combination with a punch and die, of mechanism for holding film flat between the punch and die for perforating comprising arcuate shaped guideways adapted to flex the film on each side of the punch and die and to hold a portion of the film flat between the guideways, said guideways contacting with the film edges only.

2. In a motion picture film perforating machine, the combination with a punch and die, of mechanism for holding film flat between the punch and die for perforating comprising an arcuate shaped guide contacting with the film edges only for curving the film near the punch and die whereby buckling of the film is eliminated.

3. In a motion picture film perforating machine, the combination with a punch and die, of mechanism for holding film flat between the punch and die for perforating comprising arcuate shaped guideways contacting with the edges of the film only and adapted to flex the film on each side of the punch and die both of said arcuate shaped guideways being curved in the same direction.

4. In a motion picture film perforating machine, the combination with a punch and die, of mechanism for holding film flat between the punch and die for perforating comprising a curved guideway contacting with the film only along the edges thereof for the film leading from the punch and die.

5. In a motion picture film perforating machine, the combination with a punch and die, of mechanism for holding film flat between the punch and die for perforating comprising curved guideways engaging the film edges only and leading to and from the punch and die.

6. In a motion picture film perforating machine, the combination of film guideways having curved ends and adapted to contact with only the edges of a film, a die having a recess over the major portion thereof with a raised die member, a punch adapted to enter the die member, whereby film will contact with the perforating machine only along the margins of the film.

7. In a film perforating machine adapted to perforate film having two or more sensitive layers thereon comprising a punch and die and film guides all having film guideways at least partially curved, said film guideways being cut away through the central portion thereof whereby the film may be supported solely by the margins and the sensitive surface of the film will lie out of contact with any part of the perforating machine.

8. A method of perforating motion picture film comprising forming a flat portion in the film by bending portions on each side of the flat portions solely by the edges and perforating the flat portion of the film.

9. A method of perforating film when in a flat condition including preventing buckling of the film by curving a portion thereof by the film edges only and perforating the film adjacent the curved portion.

10. A method of perforating film when in a flat condition including preventing buckling of the film beneath a punch and die by curving the film solely by the edges on each side of the punch and die.

Signed at Rochester, New York, this 19th day of Dec., 1929.

JOHN G. JONES.